US005675850A

United States Patent [19]

Schmitt

[11] Patent Number: 5,675,850

[45] Date of Patent: Oct. 14, 1997

[54] APPARATUS AND METHOD FOR RELIEVING LUMBAR PAIN

[76] Inventor: Joseph J. Schmitt, 2604 Cello La., Lutz, Fla. 33549

[21] Appl. No.: 644,606

[22] Filed: Apr. 15, 1996

[51] Int. Cl.$^6$ .......... A61C 7/04

[52] U.S. Cl. .......... 5/630; 5/652; 128/84

[58] Field of Search .......... 5/630, 632, 643, 5/645, 652; 606/240; 128/845

[56] References Cited

U.S. PATENT DOCUMENTS

| | | | |
|---|---|---|---|
| 2,612,158 | 9/1952 | Manley | 5/630 X |
| 2,663,881 | 12/1953 | Mira | 5/643 X |
| 2,777,440 | 1/1957 | Baker | 606/240 |
| 3,719,185 | 3/1973 | Hanes | 5/630 X |
| 3,842,453 | 10/1974 | Redfield | 5/491 X |
| 5,020,175 | 6/1991 | Kirkpatrick et al. | 5/652 |
| 5,544,377 | 8/1996 | Gostine | 5/630 |

*Primary Examiner*—Michael F. Trettel
*Attorney, Agent, or Firm*—David Kiewit

[57] ABSTRACT

A bolster has an axial compressibility profile chosen so that lumbar pain can be relieved when the user places the bolster under his or her spine and rolls from a softer portion of the bolster to a firmer portion of it. A preferred bolster comprises a tubular outer portion formed from a resilient closed-cell polymeric foam material such as polyurethane. This outer tubular portion serves to cushion the user and prevent discomfort. The bolster has a relatively rigid portion at one or both ends, and a transition portion between the rigid end and a softer portion some distance from the end.

6 Claims, 2 Drawing Sheets

APPARATUS AND METHOD FOR RELIEVING LUMBAR PAIN

BACKGROUND OF THE INVENTION

1. Field of the Invention

The invention provides apparatus and method for treating lumbar pain.

2. Description of Prior Art

Many people suffer pervasive or occasional pains in the back that can be alleviated by chiropractic manipulation of the lumbar portion of the spine and associated connective tissue. The prior art does not provide means whereby the sufferer can conveniently manipulate his own lumbar region and twist his spine to temporarily alleviate back pain.

Apparatus comprising a pair of resilient balls at the ends of a length-adjustable bar has been used for the relief of back pain. The user of this apparatus places it on a carpeted floor and lies supine upon it with the balls disposed at either side of his or her spine. The user then moves so as to roll the balls along both sides of the spine from the top of the thoratic region down to the lumbar region thereof.

Prior art apparatus and method believed to be relevant to the present invention are represented in the patent literature by:

U.S. Pat. No. 5,279,310, wherein Hsien shows a spinal correction device comprising a lumbar portion having inflation chambers used to adapt the device to the curve of the user's spine.

U.S. Pat. No. 4,916,765, wherein Castronovo, Jr. shows a pillow having deformable inserts, each of the inserts having a uniform compressibility along its length.

U.S. Pat. No. 3,842,453, wherein Redfield shows a pillow having a rigid core with its greatest diameter at the center of the pillow and that narrows in diameter towards the ends of the pillow.

U.S. Pat. No. 3,719,165, wherein Hanes shows a bolster having a rigid core surrounded by cushioning foam and teaches the use of the bolster to treat cervical problems.

U.S. Pat. No. 3,308,491, wherein Spence teaches a support cushion having a central body-supporting portion filled with a silicone gel and an outer frame-like portion that holds the gel-filled cushion in position.

U.S. Pat. No. 3,234,569, wherein Stewart shows a cervical support similar to that of Hanes.

U.S. Pat. No. 3,419,268, wherein Bellet shows a lumbar support having a compressibility that varies radially. In a preferred structure the rigid core is surrounded by layers of foam, each successive layer being made of a more compressible material.

U.S. Pat. No. 2,854,971, wherein Williams teaches a spinal treatment device stiffer in the middle than at the ends.

U.S. Pat. No. 2,612,158, wherein Manley shows a sacroiliac support having a gap below the patient's spine, the gap rendering Manley's device more rigid at the ends than in the middle.

SUMMARY OF THE INVENTION

The invention provides a pillow or bolster having an axial compressibility profile chosen so that lumbar pain can be relieved when the user places the bolster under his or her spine and rolls from a softer portion of the bolster to a firmer portion thereof.

It is an object of the invention to provide an implement for chiropractic manipulation of the lumbar spine.

It is a further object of the invention to provide a method of treating lumbar pain, the method comprising an exercise wherein the patient lies supine upon a bolster, the compressibility of which varies along its axis, and rolls so that his or her spine moves from a more compressible to a less compressible portion of the bolster.

DESCRIPTION OF THE PREFERRED EMBODIMENT

Figure 1:
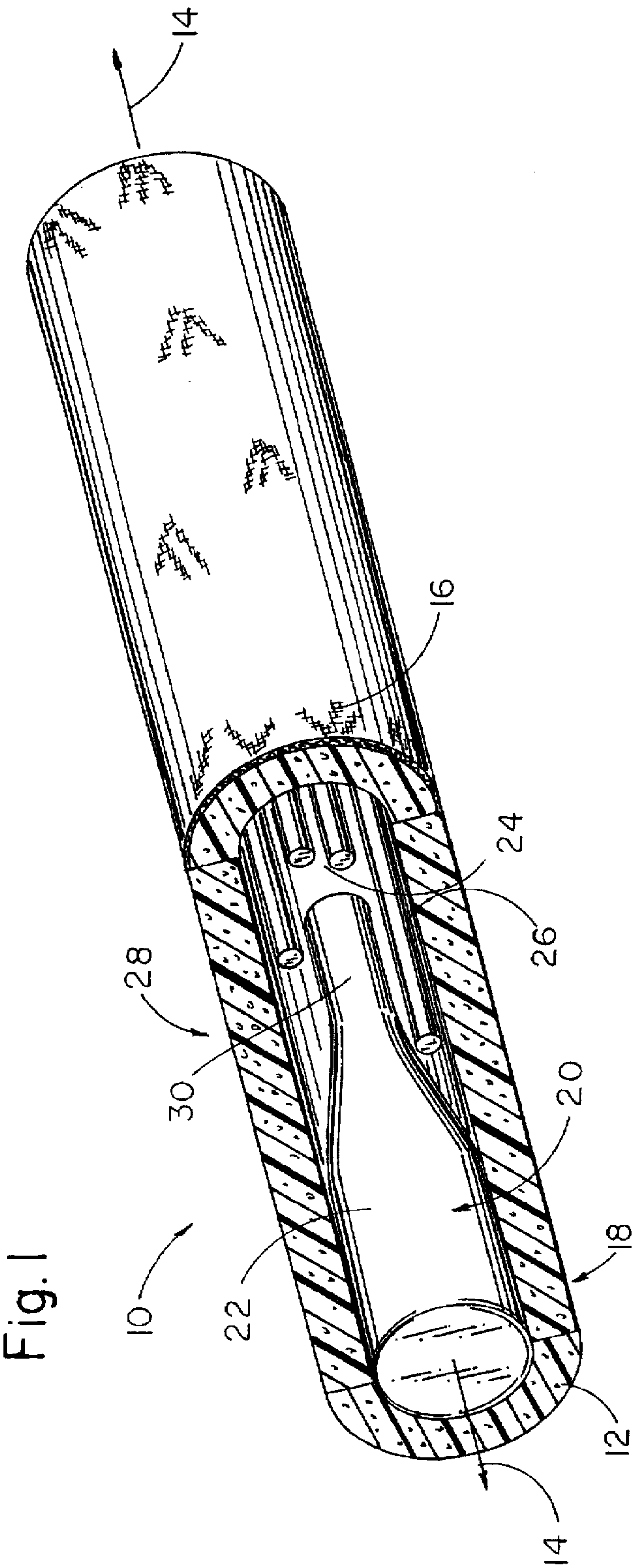
FIG. 1 is a partly cut-away view of the apparatus of the invention.
Figure 2:
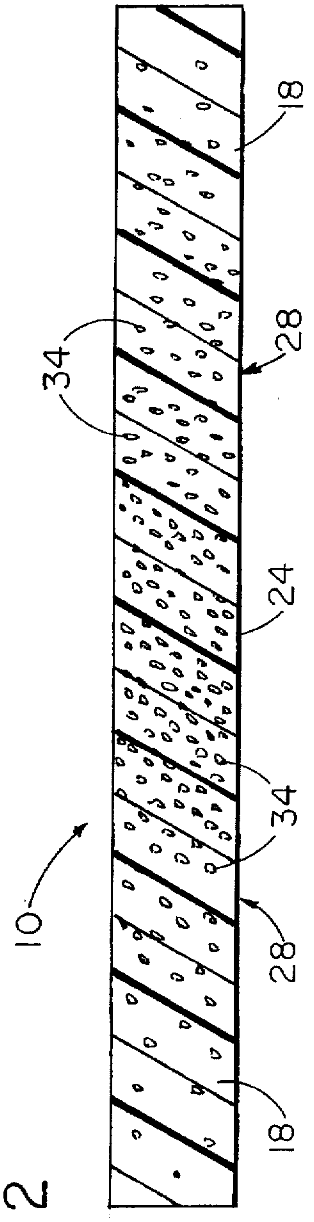
FIG. 2 is an axial cross-section of a second embodiment thereof.

The structure of a bolster 10 for treating lumbar pain is depicted in the partly cut-away view of FIG. 1. A preferred bolster 10 comprises a tubular outer portion 12 formed from a resilient closed-cell polymeric foam material such as polyurethane. This outer tubular portion 12 serves to cushion the user 11 and prevent discomfort from bodily contact with relatively more rigid portions of the bolster 10. Although the compressibility of the bolster 10, as perceived by a user 11 lying thereon, varies along its axis 14, as will be disclosed hereinafter, in many cases the compressibility of the outer tubular portion 12 of the bolster will be uniform along its length. Moreover, the outer tubular portion 12 may be covered by a fabric or plastic sheet covering 16, as is commonly done with pillows and bolsters to provide an attractive appearance.

A relatively rigid portion 18 of the apparatus of the invention 10 is provided adjacent one or both ends thereof. In the embodiment depicted in FIG. 1, the rigid portion 18 comprises an effectively completely rigid core 20 surrounded by a relatively thick outer tube 12 capable of cushioning the user's 11 body. In other embodiments, where the outer tube 12 is relatively thin, a partially compressible core 20 is preferred. Experimental models made to date have employed core elements 20 that have been completely rigid (e.g., a heavy-walled glass bottle 22) or slightly compressible (e.g., a thin-walled polyethylene teraphthalate bottle completely filled with coffee beans or small pebbles). The relatively rigid portion 18 is generally at least six inches long, and, in a preferred embodiment is eight to ten inches long. The relatively rigid portion 18 must raise a portion of the user's spine 32 far enough to induce adequate curvature in the lumbar portion thereof. A lifting height of four to six inches above a horizontal surface 32 on which the apparatus is placed has generally been found to be adequate. In the depiction of FIG. 1, this maximum height is equal to the diameter of the outer cylindrical portion 12, but there is no requirement that the apparatus be a circular cylinder. Other shapes for which the maximum height was not a diameter (e.g., a tubular element having a semi-circular cross section) could also be used for the apparatus.

A significantly softer core portion 24 of the lumbar bolster 10 may have a compressibility equal to or somewhat less than that of the outer tubular portion 12. In experimental models, a wide variety of cushioning materials 26 (e.g., tom pieces of low-density polymeric foam, polystyrene beads or "peanuts" conventionally used as packaging materials, and cut sections of axially split low density polyurethane foam tubes of the sod commonly used to insulate hot water pipes) have been used successfully.

A transition portion 28 of the lumbar bolster 10 is disposed along its axis 14 between the rigid 18 and softer 24 portions thereof. In some experimental models, the transition region 28 has often been provided by selecting a bottle 22 having a smoothly tapering neck 30. The transition region 28 is chosen to be long enough so that a user 11 can roll from the soft 24 to the rigid 18 portions of the apparatus 10 without encountering perceptible edges or abutments. In a preferred lumbar bolster 10 this transition region 28 is three to four inches long. It may be noted that although the drawing depicts the transition portion 28 as part of a bottle 22 having a conventional circular cross-section, one may also provide a transition region 28 having a different shape—e.g., one with a flattened ellipsoidal cross-section, such as one finds in the neck of a household vacuum cleaner crevice nozzle.

It will be recognized that approaches other than filling a tube with objects of varying rigidity can be taken to provide a bolster 10 having the desired axial rigidity variation. One could, for example, consider making a lumbar apparatus 10 of a foamed plastic body having a greater concentration of bubbles 34 in a central portion 24, and a lower concentration of bubbles 34 at the more rigid end portions 18, with a gradient in bubble density between the two portions 18, 24.

Figure 3:
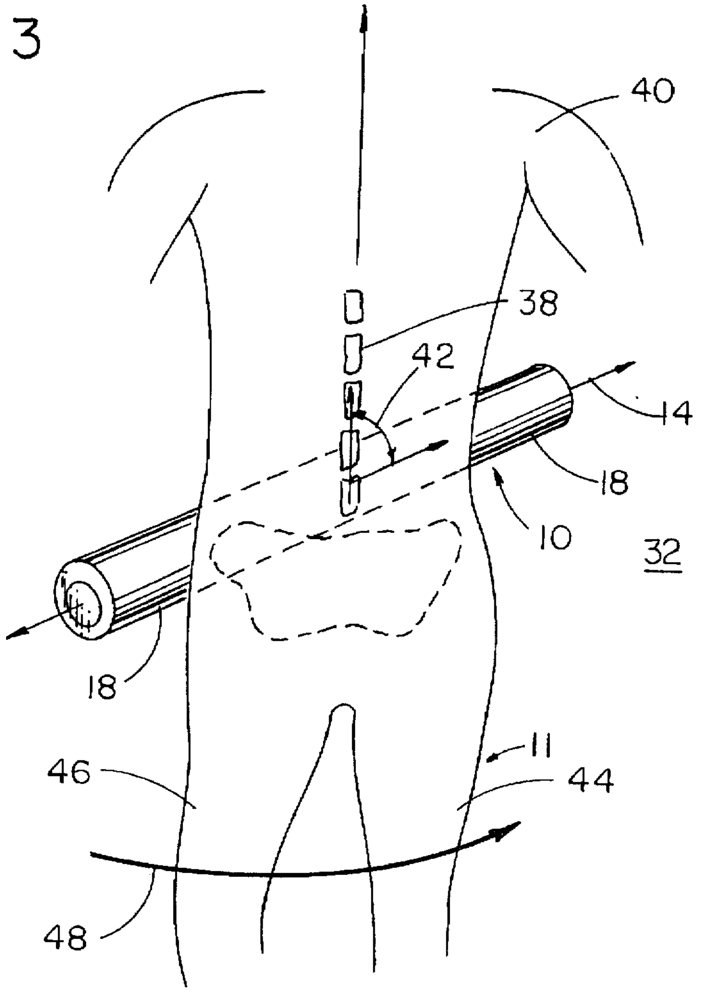
FIG. 3 is a partly cut-away plan view of a user lying on the apparatus of the invention.

In most cases it is expected that the apparatus 10 will be made with two rigid end portions 18 and will be long enough that both of the ends 18 extend beyond the margins of a user's 11 body when the user lies on the apparatus 10 so that the apparatus 10 is skewed with respect to the user's spine, as depicted in FIG. 3. In these cases, it is expect that the apparatus 10 will be about thirty to forty inches in length. In other cases (e.g., when a regular user desires to take the apparatus 10 along on a trip) the lumbar bolster 10 will be about half that length, and will have only one rigid end portion 18, the other end comprising the softer portion 24.

Figure 4:
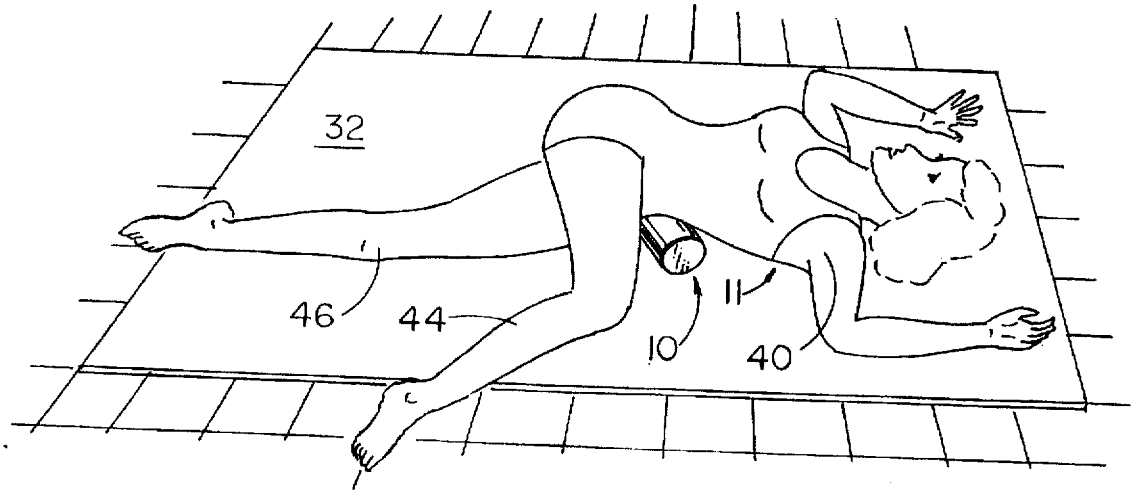
FIG. 4 is a perspective view of a user carrying out an analgesic maneuver with the aid of the apparatus of the invention.

The operation and use of the lumbar bolster 10 will now be described with particular regard to FIGS. 3 and 4. A person 11 suffering from lumbar pain is instructed to lay the lumbar bolster 10 on a floor 32 or other rigid horizontal surface and to then lie supine upon the apparatus 10 in a starting position similar to that depicted in FIG. 3—i.e., with the lumbar apparatus 10 generally transverse to the user's spine 38 but skewed with respect to the sagittal plane; with the spine 38 above the softer portion 24 of the apparatus 10; with the rigid portion 18 thereof projecting beyond the lateral margin of the user's body 11; and with the shoulders 40 flat on the floor. The inventor's use of the lumbar bolster 10 has established that the preferred angle 42 between the spine 38 and the apparatus 10 is in the range of seventy to eighty degrees.

The user 11 is instructed to consciously relax the muscles of the lower back to facilitate the therapeutic maneuver. It has been found in practice that tense muscles can overcome the effect of the bolster and make the treatment ineffective. The user 11 then rolls his or her body onto the raised plateau provided by the rigid portion 18 of the apparatus 10 proximal his or her head. In a preferred rolling maneuver the user 11 swings one leg 44 over the other 46, in the direction indicated with the bold arrow 48 in FIG. 3, while keeping his or her shoulders 40 on the floor 32. This rolling maneuver twists the spine 38 and relieves the lumbar pain—a process often producing an audible "pop" well known to back patients.

Skewing the bolster 10 with respect of the spine 38 and providing a rigid portion 18 with a preferred length of eight to ten inches allows the user to "scan" his or her spine 38 to some extent. That is, as one rolls onto the skewed rigid portion 18, several vertebrae are sequentially affected by the maneuver so that precise alignment of the bolster 10 and the spine 38 is not as important as it would be if the bolster 10 were nominally perpendicular to the spine 38.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A bolster for treating lumbar pain, the bolster comprising a rigid portion adjacent a first end thereof, the rigid portion comprising a first portion of a foamed plastic body, the first portion having a first concentration of bubbles; a soft portion spaced apart from the rigid portion along the axis of the bolster, the soft portion comprising a second portion of the foamed plastic body, the second portion having a second concentration of bubbles, the second concentration greater than the first concentration; and a transition portion intermediate the soft and the rigid portions, the transition portion providing a gradual change in compressibility, as perceived by a user lying on the bolster, from a first compressibility characteristic of the first end of the bolster to a second compressibility characteristic of the soft portion.

2. The bolster of claim 1 having a second rigid portion adjacent a second end thereof, the bolster longer than a width of the user's body.

3. The bolster of claim 1 wherein the soft portion is adjacent a second end of the bolster, the bolster longer than one half the width of the user's body.

4. The bolster of claim 1 wherein the rigid portion has a length of eight to ten inches.

5. A method whereby a person afflicted with pain in the lumbar portion of his or her spine may obtain relief therefrom, the method comprising the steps of:

a) placing a bolster on a horizontal surface, the bolster having a compressibility varying along an axis thereof from a rigid portion disposed at one end thereof to a soft portion:

b) lying supine upon the bolster so that an angle between the axis of the bolster and the spine is between seventy and eighty degrees and the spine is above the soft portion of the bolster; and c) rolling the lumbar portion of the spine from the soft portion to the hard portion of the bolster.

6. A method whereby a person afflicted with pain in the lumbar portion of his or her spine may obtain relief therefrom, the method comprising the steps of:

a) placing a bolster on a horizontal surface, the bolster having a compressibility varying along an axis thereof from a rigid portion disposed at one end thereof to a soft portion;

b) lying supine upon the bolster so that the bolster is transverse to the spine and the spine is above soft portion of the bolster; and c) rolling the lumbar portion of the spine from the soft portion to the hard portion of the bolster, wherein the act of rolling the lumbar portion of the spine comprises the person swinging one of his or her legs over the other while keeping his or her shoulders in contact with the horizontal surface.

* * * * *